United States Patent [19]

Fukasawa et al.

[11] Patent Number: 5,662,552

[45] Date of Patent: Sep. 2, 1997

[54] LOCK-UP CLUTCH SLIP CONTROL DEVICE

[75] Inventors: Osamu Fukasawa, Obu; Mitsuo Hara, Haguri-gun, both of Japan

[73] Assignee: Nippondenso Co., Ltd., Kariya, Japan

[21] Appl. No.: 502,649

[22] Filed: Jul. 14, 1995

[30] Foreign Application Priority Data

Jul. 26, 1994 [JP] Japan .................. 6-174162

[51] Int. Cl.$^6$ .................................. F16H 61/14
[52] U.S. Cl. .............................. 477/169; 477/176
[58] Field of Search ......................... 477/166, 168, 477/169, 174, 175, 176

[56] References Cited

U.S. PATENT DOCUMENTS

| | | | |
|---|---|---|---|
| 4,872,540 | 10/1989 | Sekine et al. | 477/175 X |
| 5,086,894 | 2/1992 | Iizuka et al. | 477/176 X |
| 5,143,191 | 9/1992 | Nobumoto et al. | 477/176 X |
| 5,190,130 | 3/1993 | Thomas et al. | 477/176 |
| 5,569,117 | 10/1996 | Kono et al. | 477/176 X |

Primary Examiner—Charles A. Marmor
Assistant Examiner—Saul J. Rodriguez
Attorney, Agent, or Firm—Cushman, Darby & Cushman IP Group of Pillsbury Madison & Sutro LLP

[57] ABSTRACT

To prevent an alteration of the target slip amount of a lock-up clutch slip control due to changes over time of a automatic transmission, and moreover to improve fuel consumption without reducing drivability, a lock-up clutch is mounted inside a torque converter. Inside the lock-up clutch, operational oil is supplied while switching between a release state and an engaged state of the clutch according to the switching function of a clutch control solenoid. Furthermore, the arbitrary slip amount (slip rate) is regulated using these two components. As a result of these controls, there is mapping of the target slip amount in the operating ranges having as parameters the throttle aperture change rate and turbine rotational speed of a throttle valve included on the intake pipe of the internal combustion engine and the turbine rotational speed of the torque converter. If the throttle aperture change rate goes above a predetermined value, the target slip amounts of the operating ranges are updated based on the target slip amount of the operating range at that time.

20 Claims, 9 Drawing Sheets

FIG.3

```
START
  ↓
UPDATE TARGET        ─── S201
SLIP AMOUNTS BY α
  ↓
END
```

FIG.4A

| ΔTA (%/sec)<br>NT(rpm) | 0 | 2 | 5 | 10 | 20 |
|---|---|---|---|---|---|
| 800 | A | E | I | M | Q |
| 900 | B | F | J | N | R |
| 1200 | C | G | K | O | S |
| 1600 | D | H | L | P | T |

FIG.4B

| ΔTA (%/sec)<br>NT(rpm) | 0 | 2 | 5 | 10 | 20 |
|---|---|---|---|---|---|
| 800 | A | $E+\alpha$ | $I+\alpha$ | $M+\alpha$ | $Q+\alpha$ |
| 900 | B | $F+\alpha$ | $J+\alpha$ | $N+\alpha$ | $R+\alpha$ |
| 1200 | C | $G+\alpha$ | $K+\alpha$ | $O+\alpha$ | $S+\alpha$ |
| 1600 | D | $H+\alpha$ | $L+\alpha$ | $P+\alpha$ | $T+\alpha$ |

FIG.7

```
     START
       ↓
┌─────────────────┐
│ UPDATE TARGET SLIP │  S301
│ AMTS W/NON ZERO  │
│  ΔTA BY α,β,γ    │
└─────────────────┘
       ↓
      END
```

FIG.8A

| NT(rpm) \ ΔTA (%/sec) | 0 | 2 | 5 | 10 | 20 |
|---|---|---|---|---|---|
| 800 | A | E | I | M | Q |
| 900 | B | F | J | N | R |
| 1200 | C | G | K | O | S |
| 1600 | D | H | L | P | T |

FIG.8B

| NT(rpm) \ ΔTA (%/sec) | 0 | 2 | 5 | 10 | 20 |
|---|---|---|---|---|---|
| 800 | A | E+β | I+β | M+β | Q+γ |
| 900 | B | F+β | J+α | N+β | R+γ |
| 1200 | C | G+β | K+β | O+β | S+γ |
| 1600 | D | H+γ | L+γ | P+γ | T+γ |

| X | UPDATE VAL. FOR CURRENT ENT. | UPDATE VAL. FOR ADJ. ENTRIES | UPDATE VAL. FOR ENTRIES 2 AWAY | UPDATE VAL. FOR ENTRIES 3 AWAY |
|---|---|---|---|---|
| 1 | $\alpha$ | $\beta$ | $\gamma$ | $\delta$ |
| 2 | $\beta$ | $\gamma$ | $\delta$ | 0 |
| 3 | $\gamma$ | 0 | 0 | 0 |

FIG.11A

| ΔTA (%/sec) NT(rpm) | 0 | 2 | 5 | 10 | 20 |
|---|---|---|---|---|---|
| 800 | A | E | I | M | Q |
| 900 | B | F | J | N | R |
| 1200 | C | G | K | O | S |
| 1600 | D | H | L | P | T |

FIG.11B

| ΔTA (%/sec) NT(rpm) | 0 | 2 | 5 | 10 | 20 |
|---|---|---|---|---|---|
| 800 | A | E+γ | I+γ | M+γ | Q+δ |
| 900 | B | F+γ | J+β | N+γ | R+δ |
| 1200 | C | G+γ | K+γ | O+γ | S+δ |
| 1600 | D | H+δ | L+δ | P+δ | T+δ |

FIG.12A

| ΔTA (%/sec) NT(rpm) | 0 | 2 | 5 | 10 | 20 |
|---|---|---|---|---|---|
| 800 | A | E | I | M | Q |
| 900 | B | F | J | N | R |
| 1200 | C | G | K | O | S |
| 1600 | D | H | L | P | T |

FIG.12B

| ΔTA (%/sec) NT(rpm) | 0 | 2 | 5 | 10 | 20 |
|---|---|---|---|---|---|
| 800 | A | E | I+α | M | Q |
| 900 | B | F | J+α | N | R |
| 1200 | C | G | K+α | O | S |
| 1600 | D | H | L+α | P | T |

FIG.13A

| NT(rpm) \ ΔTA [%/sec] | 0 | 2 | 5 | 10 | 20 |
|---|---|---|---|---|---|
| 800 | A | E | I | M | Q |
| 900 | B | F | J | N | R |
| 1200 | C | G | K | O | S |
| 1600 | D | H | L | P | T |

FIG.13B

| NT(rpm) \ ΔTA [%/sec] | 0 | 2 | 5 | 10 | 20 |
|---|---|---|---|---|---|
| 800 | A | E+β | I+β | M+β | Q+γ |
| 900 | B | F | J+α | N+β | R+γ |
| 1200 | C | G+β | K+β | O+β | S+γ |
| 1600 | D | H+γ | L+γ | P+γ | T+γ | ns
LOCK-UP CLUTCH SLIP CONTROL DEVICE

CROSS-REFERENCE TO RELATED APPLICATION

This application is related to and claims priority under 35 U.S.C. §119 from Japanese Patent Application No. Hei. 6-174162, incorporated herein by reference.

BACKGROUND OF THE INVENTION

1. Field of the Invention

This invention is directed to a lock-up clutch slip control device to carry out control so that the difference in the rotational speed of input and output axes of a fluid coupling of an automatic transmission converges on a target slip amount.

2. Description of Related Art

Generally, with automatic transmissions that include a lock-up mechanism, a lock-up clutch is in a totally locked state at high speeds in order to reduce transmission loss in a fluid coupling and thus improve fuel consumption. For this reason, there is a direct connection between input and output axes of the fluid coupling. However, at low speeds there is a need for torque amplification action in the fluid coupling. Moreover, at low speeds the lock-up clutch is in a released state to prevent vehicle vibration due to torque fluctuation in the internal combustion engine. This can lead to increased fuel consumption. Thus, in conventional devices, during low speeds the slip amount (i.e., the difference in the rotational speed of the engine and the turbine), and a solenoid duty valve is employed to control the pressure of oil supplied to the lock-up clutch to reach a target slip amount (target value), thus improving fuel consumption.

Japanese Non-Examined Patent Publication No. Hei. 1-206159 discloses a system where the target slip amount is set according to mutually changing multiple patterns based on the driving state of the internal combustion engine to prevent a reduction in drivability.

Japanese Non-Examined Patent Publication No. Hei. 3-14965 discloses a system where based on the difference detected between the input torque and input and output rotational speed, occurrence of an acceleration malfunction is determined after a set time and, if an acceleration malfunction occurs, the target differential oil pressure to the locking clutch is compensated to provide stable slip control.

The two systems described above assume that a pre-set target slip amount is always correct, and slip control is carried out based on that value. However, due to (for example) initial variations in the target slip amount or changes in vehicle characteristics together with changes over time of automatic transmission characteristics, the target slip amount will not always be correct and there could be a reduction in drivability based on acceleration malfunctions, etc. According to the latter system, occurrence of an acceleration malfunction is determined based on whether the target slip amount is reached after a set time. Thus, an increase in throttle aperture could occur for that time and lead to a reduction in drivability and fuel consumption.

SUMMARY OF THE INVENTION

The present invention was made to solve such problems. It offers a lock-up clutch slip control device to prevent alteration of the target slip amount of the lock-up clutch slip control due to changes over time of the automatic transmission, and to thereby improve fuel consumption without causing a reduction in drivability.

According to a first aspect of the invention, a slip amount computation section is used to compute the target slip amount of a slip control mechanism to control the engagement state of a lock-up clutch of a lock-up mechanism in order to attain a set rotational speed difference relative to an operating range set according to the throttle aperture change rate and turbine rotational speed. Furthermore, according to a range-specific learning section, if the throttle aperture change rate detected by a change rate detection section is above a predetermined value, the target slip amount of the operating range at that time is used as the basis for updating the target slip amount for each operating range.

According to another aspect of the invention, the target slip amount is not updated in a normal operating range so that there is no negative effect on the stability of the target slip amount of the slip control mechanism.

According to a further aspect of the present invention, the target slip amounts of all operating ranges other than the normal operating range are updated uniformly based on judgment in an operating range, thus improving learning efficiency.

According to yet another aspect of the present invention, it is possible to change the effect of a present updating of the target slip amount on other operating ranges according to adjacency conditions among the operating ranges.

According to a still further aspect of the present invention, it is possible to change the influence of a present update of the target slip amount on operating ranges other than the normal operating range based on the throttle aperture change rate and adjacency conditions among the operating ranges.

It is possible to decrease the influence of a present update of the target slip amount on other operating ranges for which the throttle aperture change rate differs.

It is possible in the present update of the target slip amount to decrease the influence on the operating range which was the center of the previous update of the target slip amount.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a flowchart of a range-specific learning control sub-routine using a table showing the processing of the CPU inside the ECU employed in a lock-up clutch slip control device according to a first embodiment of the present invention FIGS. 4A and 4B are tables showing target slip amounts of operating ranges with respect to throttle aperture change rate ΔTA and turbine rotational speed NT as used by the lock-up clutch slip control device according to the first embodiment of the present invention.

FIG. 7 is a range-specific learning control sub-routine using a tab bowing the processing of the CPU inside the ECU employed in a lock-up clutch slip control device relating to a second embodiment of the present invention.

FIGS. 8A and 8B are tables showing target slip amounts of operating ranges with respect to throttle aperture change rate ΔTA and turbine rotational speed NT as used by the lock-up clutch slip control device according to the second embodiment of the present invention.

FIGS. 11A and 11B are tables showing target slip amounts of the operating ranges with respect to throttle aperture change rate ΔTA and turbine rotational speed NT as used by the lock-up clutch slip control device according to the third embodiment of the present invention.

FIGS. 12 and 12B are tables showing target slip amounts of the operating ranges with the parameters of throttle aperture change rate ΔTA and turbine rotational speed NT as used by a lock-up clutch slip control device according to a fourth embodiment of the present invention.

FIGS. 13A and 13B are tables showing target slip amounts of the operating ranges with the parameters of throttle aperture change rate ΔTA and turbine rotational speed NT as used by the lock-up clutch slip control device according to a fifth embodiment of the present invention.

DESCRIPTION OF THE PREFERRED EMBODIMENTS

A description of the invention based on preferred embodiments thereof follows.

Figure 1:
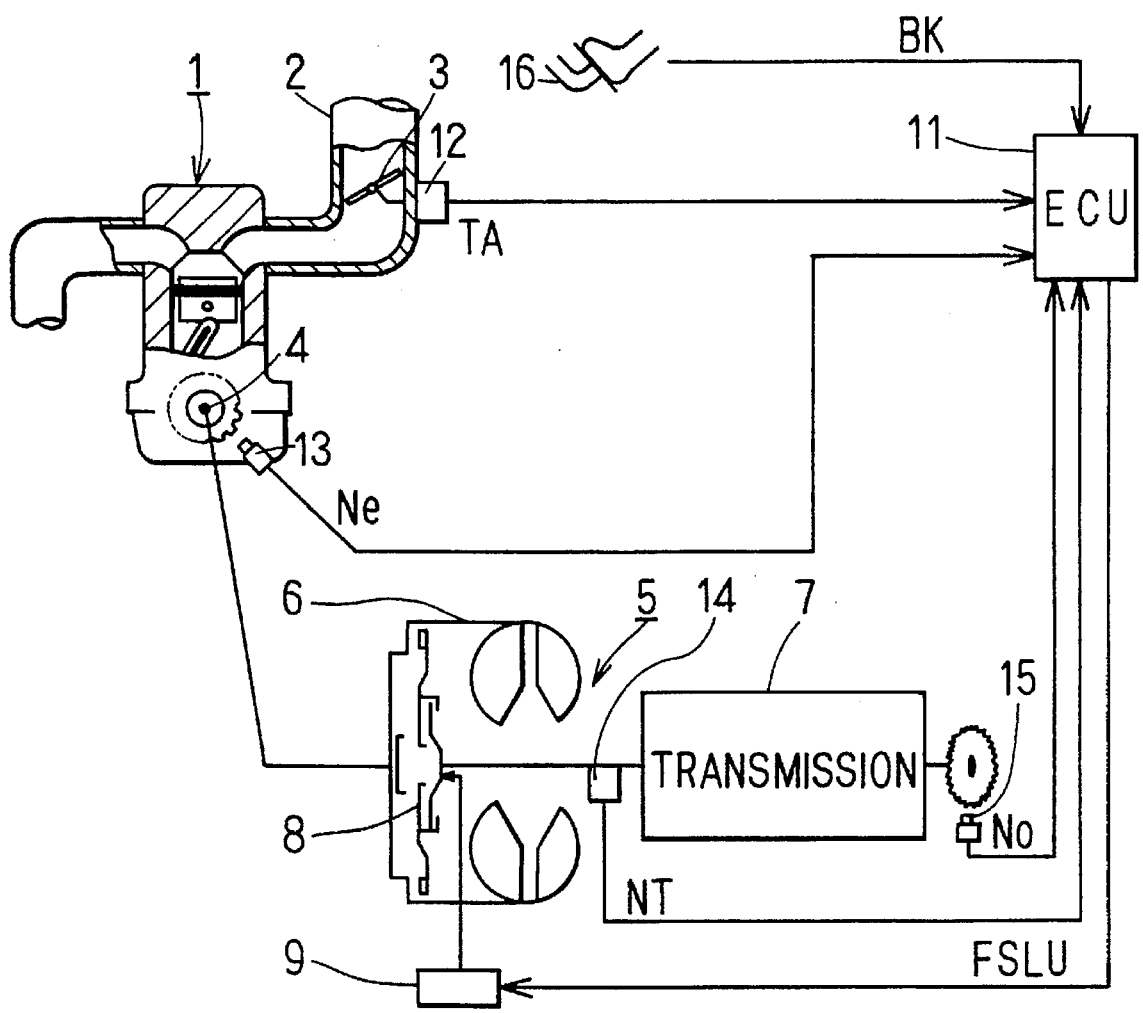
FIG. 1 is a schematic view showing an internal combustion engine and automatic transmission to which a lock-up clutch slip control device according to the present invention can be appropriately applied.

FIG. 1 is a schematic view illustrating an internal combustion engine and an automatic transmission using a lock-up clutch slip control device according to a first embodiment of the present invention.

In FIG. 1, a throttle valve 3 is disposed in an intake pipe 2 of an internal combustion engine 1. The throttle valve 3 is used to regulate the amount of intake air supplied to the internal combustion engine 1 and thus control engine output. A transmission mechanism 7 is connected to a crankshaft 4 of the internal combustion engine 1 via a torque converter 6 acting as a fluid coupling of an automatic transmission 5 (shown in the figure as separated from the internal combustion engine 1 for the sake of convenience). The transmission mechanism 7 is connected to a drive wheel via a drive system of a vehicle (not shown). A lock-up clutch 8 is mounted inside the torque converter 6. Inside the lock-up clutch 8, operational oil is supplied while switching between a release state and an engaged state of the clutch according to the switching operation of a clutch control solenoid 9. Furthermore, the arbitrary slip amount (slip rate) is regulated between these two states.

As is known, when the lock-up clutch 8 is released, the torque of the internal combustion engine 1 is transmitted to the transmission mechanism 7 via the torque converter 6.

When the lock-up clutch 8 is engaged, the torque is transmitted to the transmission mechanism 7 via the lock-up clutch 8 without passing through the torque converter 6. During slip control, torque is transmitted via the torque converter 6 and the lock-up clutch 8 to the transmission mechanism 7 at a duty ratio corresponding to the slip amount.

An ECU 11 (Electronic Control Unit) controlling the lock-up clutch 8 is composed of logic and computing circuits including a CPU, ROM and RAM (not shown). The clutch control solenoid 9 is connected to the output side of the ECU 11. The following sensors are connected to the input side of the ECU 11: a throttle aperture sensor 12 detecting the throttle aperture TA of the throttle valve 3, an engine rotational speed sensor 13 detecting the engine rotational speed Ne of the internal combustion engine 1, a turbine rotational speed sensor 14 attached to the input side of the transmission mechanism 7 and detecting the turbine rotational speed NT, an output rotational speed sensor 15 attached to the output side of the transmission mechanism 7 and detecting the output rotational speed No, and a brake switch sensor 16 detecting the brake operation signal BK.

Based on the outputs of the sensors, the ECU 11 appropriately sets the lock-up oil pressure control signal FSLU to control the duty ratio relative to the clutch control solenoid 9. This is used to adjust the oil pressure of the operational oil supplied from the clutch control solenoid 9 to the lock-up clutch 8 and thus control the slip amount. Furthermore, the ECU 11 in the present embodiment may be a unit that not only controls the lock-up clutch 8 but also controls speed changes of the automatic transmission 5 and fuel supply to the internal combustion engine 1.

Figure 2:
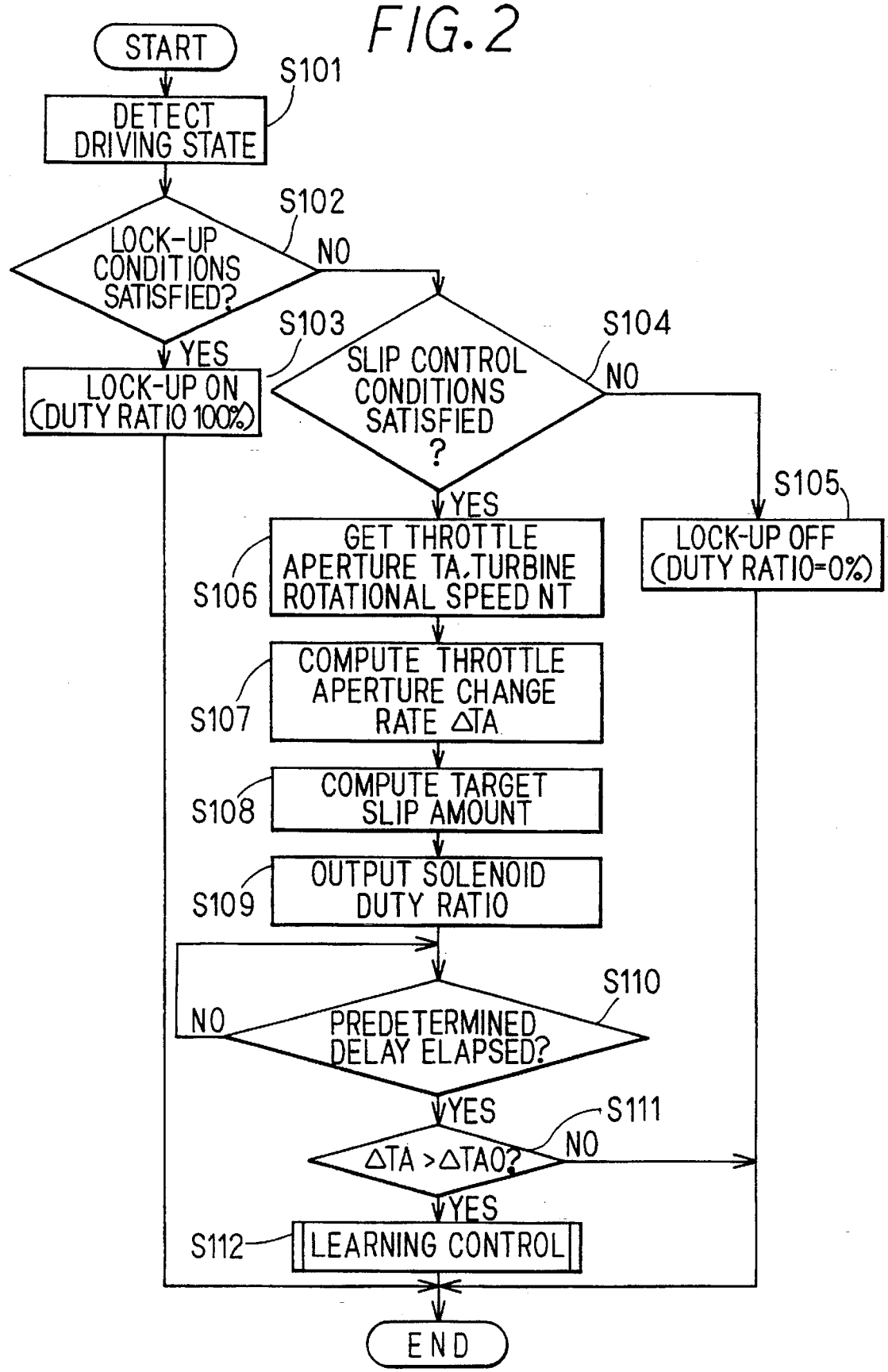
FIG. 2 is a slip control main routine showing the processing of the CPU inside the ECU employed in the lock-up clutch slip control device according to the present invention.

A description of the processing of the CPU inside the ECU 11 used in the slip control device of the lock-up clutch according to the first embodiment of the present invention follows, based on the flowcharts in FIGS. 2 and 3. FIG. 2 shows the slip control main routine, and FIG. 3 shows a range-specific learning control sub-routine using a table to compute the target slip amount.

In FIG. 2, step S101 detects the driving state. The driving state mentioned here includes the throttle aperture TA, the vehicle speed No, the engine rotational speed Ne, the current shift gear, the cooling water temperature, and the like. Next, the process proceeds to step S102 which determines whether L/U (Lock-Up) execution conditions are satisfied in the lock-up clutch 8 mounted inside the torque converter 6 of the automatic transmission 5. As is shown in the graph in FIG. 5, the L/U execution conditions are determined by the vehicle speed No (km/h) from the output rotational speed sensor 15 and the throttle aperture TA (%) from the throttle aperture sensor 12. If, for example, the maximum aperture of the throttle valve 3 is 80 degrees, the throttle aperture TA expresses the ratio (%) corresponding to the angle when 80 degrees is considered to be 100%. With control by means of the graph, the following are L/U execution conditions: the cooling water temperature is greater than or equal to a predetermined value and the engine is not in an idle state; the gear shift position is in the drive range; and a predetermined amount of time has elapsed after a signal to a solenoid which changes the gear state of the automatic transmission and it is not engaged in changing speeds. When the determination conditions in step S102 are fulfilled, the process proceeds to step S103 where L/U is set ON. In this step, the duty ratio of the clutch control solenoid 9 of the lock-up clutch 8 is 100% and there is lock-up between the engine 1 and transmission 7 via the lock-up clutch 8 to finish the main routine.

If the judgment conditions in step S102 are not satisfied, the process proceeds to step S104 which determines whether the slip control execution conditions are satisfied. As is shown in the graph in FIG. 5, the slip control execution conditions are determined based on the vehicle speed (km/h) and the throttle aperture (%). If the judgment conditions in step S104 are not satisfied, the process proceeds to step S105 where L/U is set OFF. In this step, the duty ratio of the clutch control solenoid 9 of the lock-up clutch 8 is 0% so that the lock-up clutch 8 is separated and there is only control of the torque converter 6, thus completing the main routine.

Figure 5:
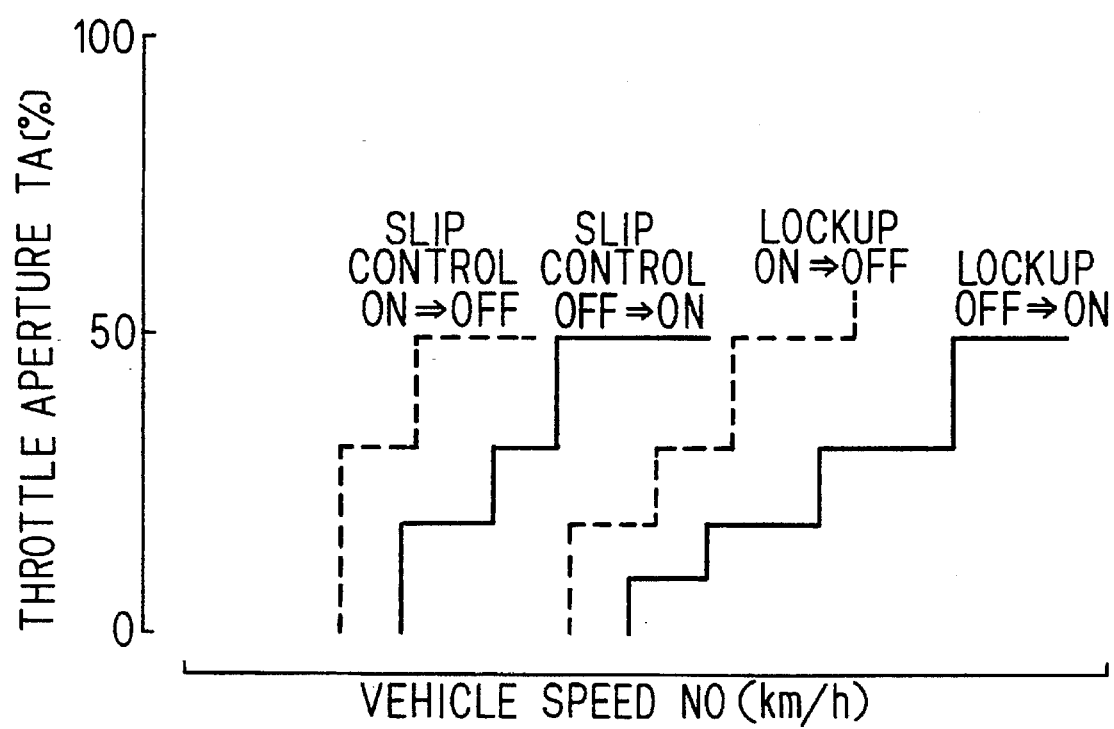
FIG. 5 is a graph showing L/U and slip control areas with respect to vehicle speed No and throttle aperture TA as used by the lock-up clutch slip control device according to the first embodiment of the present invention.

Furthermore, as shown in FIG. 5, the area between OFF-ON represented by a solid line and ON-OFF represented by a dotted line as L/U execution conditions, as well as the OFF-ON represented by a solid line and ON-OFF represented by a dotted line as slip control execution conditions are the hysteresis amounts to prevent chattering.

If the determination conditions in step S104 are satisfied, the process proceeds to step S106 which reads the throttle aperture TA (%) and the turbine rotational speed NT (rpm) before proceeding to step S107. Step S107 computes the throttle aperture change rate ΔTA (%/sec) from the previous and the present throttle aperture TA before proceeding to step S108. Here the target slip amount (rpm) is Computed based on a table with the parameters of the throttle aperture change rate ΔTA (%/sec) and the turbine rotational speed NT (rpm). Then the process proceeds to step S109 which outputs the duty ratio of the clutch control solenoid 9 of the lock-up clutch 8 corresponding to the target slip amount to thus carry out slip control. In step S110 the system waits until 500 ms have elapsed as the designated time before proceeding to step S111 which determines whether the throttle aperture change rate ΔTA exceeds a pre-set designated value ΔTAO (ΔTA>ΔTAO). If the determination conditions in step S111 are satisfied and the throttle aperture change rate ΔTA exceeds the designated value ΔTAO, the process proceeds to step S112 which executes the range-specific learning control sub-routine described later in order to finish the main routine.

If the judgment conditions in step S111 are not satisfied and the throttle aperture change rate ΔTA is less than the designated value ΔTAO, the processes in step S112 are skipped and the main routine is finished. In other words, once slip control based on the target slip amount computed from the table is executed, if the throttle aperture increases and an acceleration malfunction occurs, the table value of the target slip amount is updated.

A description of the range-specific learning control sub-routine as shown in FIG. 3 follows next.

As shown in FIG. 3, step S201 uniformly adds an amount α (rpm) to the individual target slip amounts (rpm) as target values of the operating ranges E through T in the table having the parameters of throttle aperture change rate ΔA (%/sec) and turbine rotational speed NT (rpm) as shown in FIG. 4A. And as shown in FIG. 4B, the map is updated, thus completing the sub-routine. However, in the normal operating range where the throttle aperture change rate ΔTA=0, addition of α (rpm) to the individual target slip amounts (rpm) in ranges A through D is inhibited. Furthermore, the target slip amounts between the adjacent operating ranges in the maps in FIG. 4A and FIG. 4B are obtained by interpolation.

It should be noted that the values A–T and α in FIGS. 4A and 4B are empirical values which are selected to approximate optimal performance. The particular values can vary depending on the particular combination of engine and transmission used, and suitable values for a given installation can be readily derived by one of ordinary skill in the art through routine experimentation.

Figure 6A:
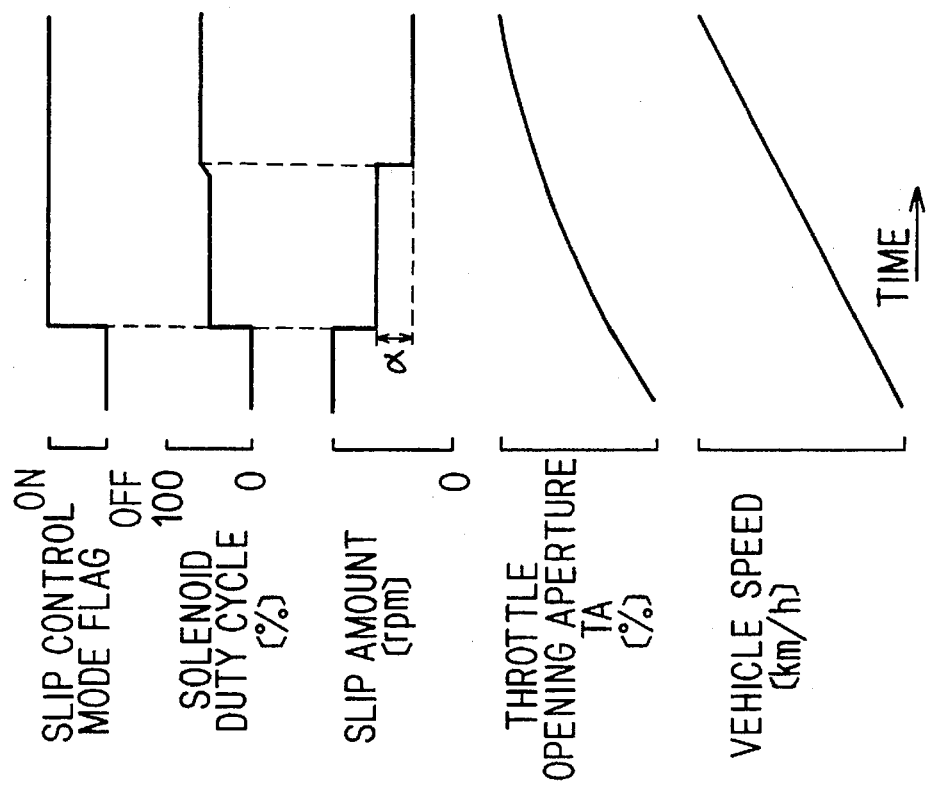
FIGS. 6A and 6B are timing charts comparing a prior art system and an internal combustion engine and automatic transmission as used by the lock-up clutch slip control device according to the first embodiment of the present invention.
Figure 6B:
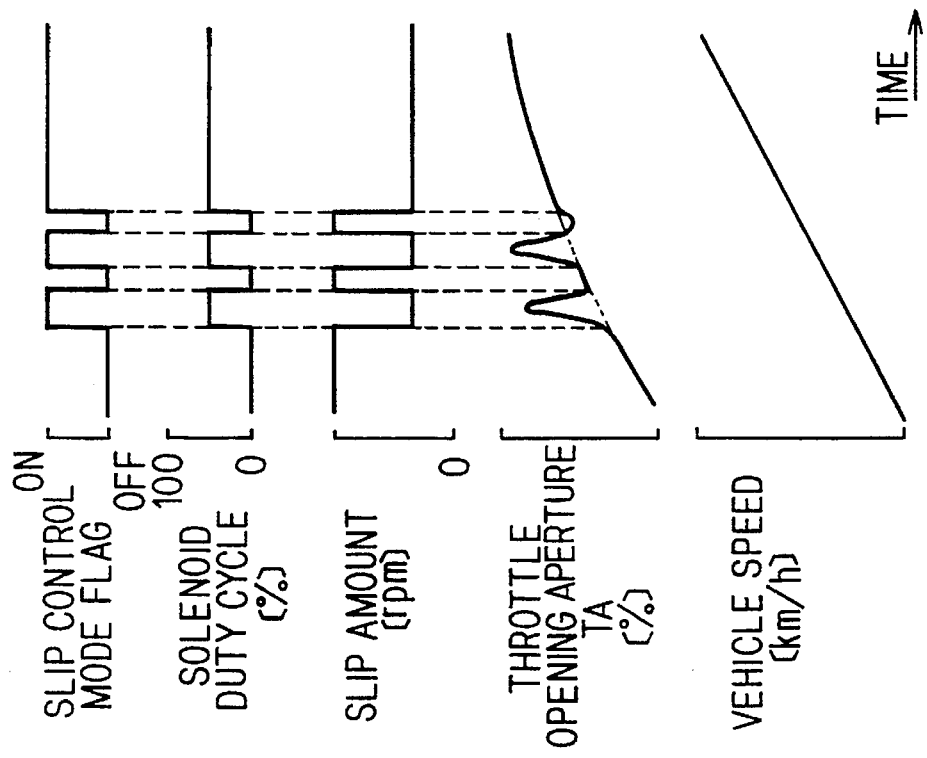

FIGS. 6A and 6B are timing charts showing a comparison between a prior art system and an automatic transmission and internal combustion engine employing a lock-up clutch slip control device according to the first embodiment of the pre-set invention.

In the example of the prior art as shown in FIG. 6A, there is deviation of the target slip amount in the initial stage so that due to the deviation of the target slip amount accompanying change over time of the internal combustion engine and automatic transmission, the slip amount during acceleration is insufficient, leading to acceleration malfunction. If the slip amount is insufficient, the throttle aperture TA (%) is changed considerably by the driver to the open side, causing hunting so that there is alternate fulfillment and non-fulfillment of slip control execution conditions. As a result, the slip control execution flag oscillates between ON and OFF, causing vehicle shock. In contrast, with the embodiment shown in FIG. 6B, once there is an acceleration malfunction, the table of the target slip amount is updated so that it is difficult for a further acceleration malfunction to occur, and smooth acceleration cad then be achieved. In this way, it is possible to improve fuel consumption without reducing drivability.

As a result of the above, the slip control mechanism controls the connecting condition of the lock-up clutch 8 of the lock-up mechanism relative to the operation range to provide a predetermined rotational speed difference between the engine 1 and the transmission 7 in the operating range determined by the throttle aperture change rate ΔTA and the turbine rotational speed NT. The target slip amount here is computed by the above described slip amount computation method. If the throttle aperture change rate ΔTA detected by the change rate detection section in the range-specific learning section is larger than a predetermined value, the target slip amounts of the operating ranges are updated based on the target slip amount of the operating range at that time.

For this reason, there is appropriate updating and correction of the deviation of the target slip amounts in slip control of the lock-up clutch 8 accompanying change over time of the automatic transmission 5 so that it is possible to improve fuel consumption without degrading drivability.

With the range-specific learning section implemented by the ECU 11 of the slip control device of the lock-up clutch 8 in the first embodiment, when updating the target slip amount, there is no updating of target slip amounts A to D of operating ranges where the throttle aperture change rate ΔTA is 0 (zero).

As a result, in normal operating ranges, there is no update of the target slip amount. Thus, there is no disturbance of the stability of the target slip amount in the slip control mechanism.

Furthermore, with the range-specific learning section implemented by the ECU 11 of the slip control device of the lock-up clutch 8 in the first embodiment, when updating the target slip amount, the target slip amounts E to T of all operating ranges are uniformly updated by +α with the exception of those for which the throttle aperture change rate ΔTA is 0 (zero).

As a result, uniform updating based on a determination in a operating range for target slip amounts of all operating ranges other than the normal operating ranges occurs. For this reason there is a good learning efficiency for updating of the target slip amounts.

FIG. 7 is a range-specific learning control sub-routine using a table for computing the target slip amount employed in a lock-up clutch slip control device according to a second embodiment of the present invention. The slip control main routine is the same as in FIG. 2 and details are omitted here. Furthermore, the schematic view of the internal combustion engine and automatic transmission employing the lock-up clutch slip control device in the second embodiment is the same as. FIG. 1 so that details are omitted here.

As shown in FIG. 7, in step S301, $\alpha$ (rpm) (shown in the shaded section in FIG. 8B) is added to the target slip amount (rpm) corresponding to the target value of J (shown in the shaded section in FIG. 8A of the operating ranges of the table having the parameters of throttle aperture change rate $\Delta TA$ (%/sec) and turbine rotational speed NT (rpm) as shown in FIG. 8A. $\beta$ (rpm) is added to the values of operating ranges adjacent to the operating range used as the standard value. Then, $\gamma$ (rpm) is added to the values of operating ranges adjacent to those ranges so that the target slip amount is updated relative to all operating ranges in the map as shown in FIG. 8B, thus ending the sub-routine. However, regarding addition to the target slip amounts (rpm) representing normal operating ranges where the throttle aperture change rate $\Delta TA=0$ shown by A to D is inhibited. Furthermore, the updating amount becomes smaller so the operating range moves further from the operating range that is standard. The updating amount in such a case is $\alpha > \beta > \gamma$. Furthermore, the value $\alpha$ added to the target slip amount is determined by the difference ($\Delta TA - \Delta TAO$) between the throttle aperture change rate $\Delta TA$ and the designated value $\Delta TAO$. The values $\beta$ and $\gamma$ are determined according to $\alpha$. In other words, $\alpha = f_0(\Delta TA - \Delta TAO)$, $\beta = f_1(\alpha)$ and $\gamma = f_2(\alpha)$. Suitable results are obtained when the functions $f_0$, $f_1$ and $f_2$ are simply fractional coefficients; e.g., $f_0(x)=0.9x$, $f_1(x)=2x/3$ or $f_2(x)=x/3$. Also, the target slip amounts of the adjacent operating ranges in the maps in FIG. 8A and FIG. 8B are determined by interpolation.

With the range-specific learning section implemented in the ECU 11 of the slip control device of the lock-up clutch in the second embodiment, if there is updating of the target slip amount, the updating amount is made smaller ($\alpha > \beta > \gamma$) the further the operating range corresponding to that target slip amount is from the operating range based on the target slip amount (J) of the operating range at that time.

As a result, it is possible to change the influence on adjacent operating ranges due to present updating of the target slip amount. For this reason, there is accurate and efficient updating and compensation of the deviation of the target slip amount during slip control of the lock-up clutch 8 accompanying change over time of the automatic transmission 5 so that it is possible to improve fuel consumption without reducing drivability.

Figures 9, 10:
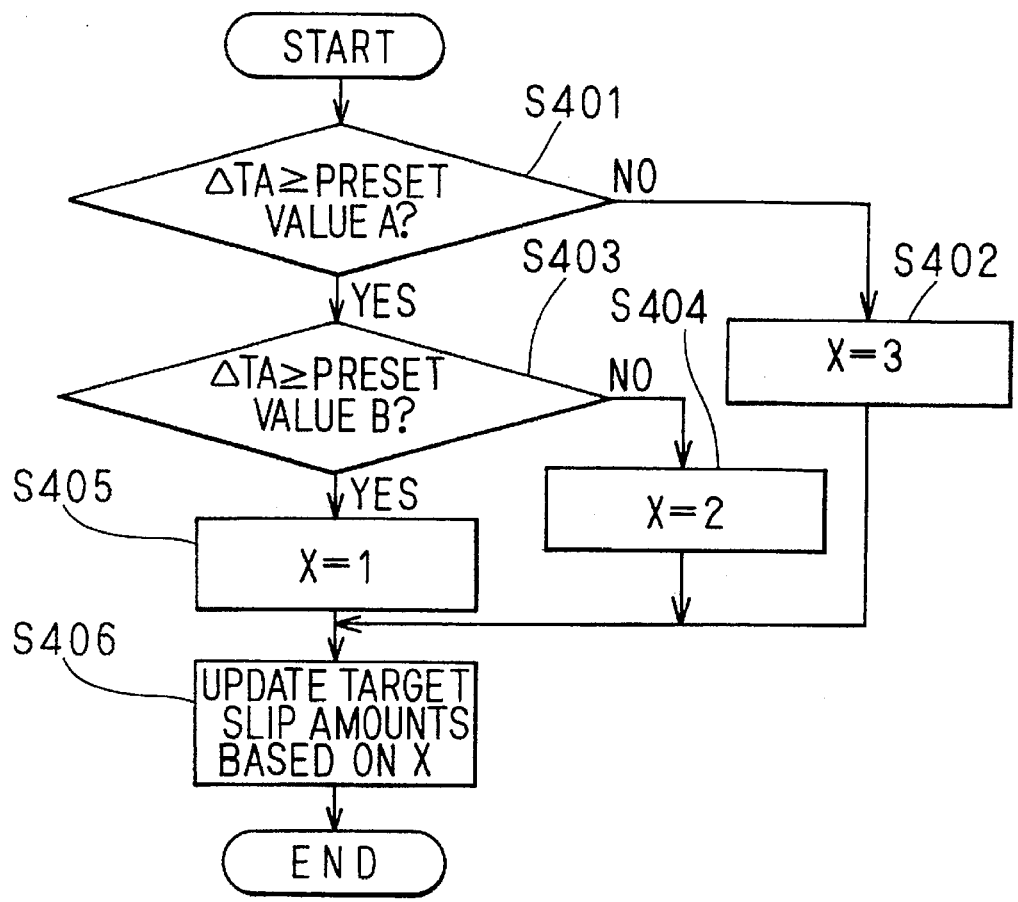
FIG. 9 a range-specific learning control sub-routine using a table showing the processing of the CPU inside the ECU employed in the lock-up clutch slip control device according to a third embodiment of the present invention.
FIG. 10 is a table showing update amounts of target slip amounts relating to the operating ranges with respect to the size of the throttle aperture change rate as used by the lock-up clutch slip control device according to the third embodiment of the present invention.

FIG. 9 is a range-specific learning control sub-routine using a table for computing the target slip amount employed in the lock-up clutch slip control device according to a third embodiment of the present invention. The slip control main routine is the same as in FIG. 2 and details are omitted here. Furthermore, the schematic view of the internal combustion engine and automatic transmission employing the lock-up clutch slip control device in the third embodiment is the same as FIG. 1 so that details are omitted here.

As shown in FIG. 9, step S401 determines whether the throttle aperture change rate $\Delta TA$ is equal to or greater than a pre-set designated value A. If the determination conditions in step S401 are not satisfied, the process proceeds to step S402 where x is set to 3. 6n the other hand, if the determination conditions in step S401 are satisfied, the process goes to step S403 which determines whether the throttle aperture change rate $\Delta TA$ is greater than or equal to a pre-set designated value B. If the determination conditions in step S403 are not satisfied, the process proceeds to step S404 where x is set to 2. On the other hand, if the determination conditions in step S403 are not satisfied, the process proceeds to step S405 where x is set to 1. After the value of x is determined in this way, the process goes to step S406 where, in accordance with the value of x, each operating range and its target value are updated, thus ending the sub-routine. In this case, the relationship between the designated values A and B is A<B.

For example, if x=2 in the range-specific learning control sub-routine of FIG. 9 using the table with the parameters of throttle aperture change rate $\Delta TA$ (%/sec) and turbine rotational speed NT (rpm) as shown in FIG. 11A, the target slip amount of the operating range that is the standard value where acceleration malfunction occurred is J (shown by the hatched area in FIG. 11A). In such a case, based on a table showing the updating amounts of the target slip amounts to the operating ranges corresponding to the size of the throttle aperture change rate $\Delta TA$ in FIG. 10, $\beta$ is added to the target slip amount J, $\gamma$ is added to the target slip amounts E to G, I, K, M to O of the adjacent operating ranges, and $\delta$ is added to the target slip amounts H, L, P to T of the operating ranges two rows away from the standard value. This results in updating of the target slip amounts to all operating ranges of the map as shown in FIG. 12B. However, in normal operating ranges where the throttle aperture change rate $\Delta TA=0$, updating of the target slip amounts (rpm) shown by A to D is inhibited. Also, the updating amount becomes smaller the further the operating range corresponding to the target slip amount is from the operating range that is standard. The relationship between the updating amounts in such a case is $\alpha > \beta > \gamma > \delta$. Furthermore, the value $\alpha$ added to the target slip amount is determined by the difference ($\Delta TA - \Delta TAO$) between the throttle aperture change rate $\Delta TA$ and the designated value $\Delta TAO$. The values $\beta$, $\gamma$, $\delta$ are determined according to $\alpha$. In other words, $\alpha = f_0(\Delta TA - \Delta TAO)$, $\beta = f_1(\alpha)$, $\gamma = f_2(\alpha)$ and $\delta = f_3(\alpha)$. Also, the target slip amounts of the adjacent operating ranges in the tables in FIG. 11A and FIG. 11B are determined by interpolation.

As above, it should be noted that the values $\alpha - \gamma$, A and B may vary depending in accordance with a particular engine/transmission combination, and suitable values are readily obtainable through routine experimentation by those skilled in the art.

With the range-specific learning means implemented in the ECU 11 of the slip control device of the lock-up clutch in the third embodiment, if the target slip amount is updated, the updating amount ($\alpha$, $\beta$, $\gamma$, $\delta$) of the target slip amounts (E to T) of the operating ranges corresponding to the size of the throttle aperture change rate $\Delta TA$ at that time are changed. As a result, it is possible to change the influence on adjacent operating ranges other than the normal operating range in the present updating of target slip amount based on the throttle aperture change rate $\Delta TA$ and according to the conditions of the adjacent operating ranges.

For this reason, there is accurate and efficient update and compensation of the deviation of the target slip amount during slip control of the lock-up clutch 8 accompanying change over time of the automatic transmission 5 so that it is possible to improve fuel consumption without reducing drivability.

FIGS. 12A and 12B shown tables used in a range-specific learning control sub-routine for computing the target slip amount employed in lock-up clutch slip control device according to a fourth embodiment of the present invention. The slip control main routine is the same as in FIG. 2 and details are omitted here. Furthermore, the schematic view of the internal combustion engine and automatic transmission employing the lock-up clutch slip control device in the fourth embodiment is the same as FIG. 1 so that details are omitted here.

In the fourth embodiment a range-specific learning control sub-routine of a map not shown in the figure is executed. Out of the operating ranges of the map with the parameters of throttle aperture change rate ΔTA (%/sec) and turbine rotational speed NT (rpm), the standard is the operational range which becomes the target slip amount (rpm) as the target value of J (shown by the hatched area in FIG. 12A). Then a value α is added only to the target slip amounts (rpm) shown by I to L of the operating ranges which have a throttle aperture change rate ΔTA that is the same as the normal operating range. Thus, the target slip amounts to the operating ranges of the table as shown by the cross-hatched area FIG. 12B are updated. Furthermore, the value α added to the target slip amounts is the coefficient α=f0 (ΔTA−ΔTAO) of the difference (ΔTA−ΔTAO) between the throttle aperture change rate ΔTA and the designated value ΔTAO.

With the range-specific learning means implemented in the ECU 11 of the slip control device of the lock-up clutch in the present embodiment, if there is updating of the target slip amount, only the target slip amounts (I to L) of the operating ranges where the throttle aperture change rate ΔTA is the same are updated by adding α.

As a result it is possible in the present updating of the target slip amount to reduce the influence on the operating ranges of which the throttle aperture change rate ΔTA is different. For this reason, there is accurate and efficient updating and compensation of the deviation of the target slip amount during slip control of the lock-up clutch 8 accompanying change over time of the automatic transmission 5 so that it is possible to improve fuel consumption without reducing drivability.

FIGS. 13A and 13B show tables used in a range-specific learning control sub-routine for computing the target slip amount employed in lock-up clutch slip control device according to a fifth embodiment of the present invention. The slip control main routine is the same as in FIG. 2 and details are omitted here. Furthermore, the schematic view of the internal combustion engine and automatic transmission employing the lock-up clutch slip control device in the fifth embodiment is the same as FIG. 1 so that details are omitted here.

In the fifth embodiment a range-specific learning control sub-routine not shown in the figure is executed. The table with the parameters Of throttle aperture change rate ΔTA (%/sec) and turbine rotational speed NT (rpm) as shown in FIG. 13A is updated as shown in FIG. 13B. In other words, among the operating ranges of the map, operating ranges having a target slip amount (rpm) as the target value F (shown by the cross-hatched area in FIG. 13A) which was used in the former table updating process are not updated with the other operating ranges in the present map update process. That is, those values become standard in operating ranges where, in the present map update, there is a target slip amount (rpm) of J as the target value (shown by slanted lines in FIG. 13A). A value of α (rpm) is added to J (shown by the cross-hatched area in FIG. 13B) so that the value of that operating range becomes standard in adding a value of β (rpm) to the value of the adjoining operating ranges. As shown in FIG. 13B, the target slip amount relative to all operational ranges on the table is updated. In operational ranges where the target slip amount (rpm) as the target value is F, the target slip amount is not updated. Likewise, in normal operating ranges where the throttle aperture change rate ΔTA=0, updating of the target slip amounts (rpm) shown by A to D is inhibited. Also, the updating amount becomes smaller the further the operating range corresponding to the target slip amount is from the operating range that is standard. The relationship between updating amounts in such a case is α>β>γ. Furthermore, the value α added to the target slip amount is determined by the difference (ΔTA−ΔTAO) between the throttle aperture change rate ΔTA and the designated value ΔTAO. The values β, γ are determined according to α. In other words, α=f0 (ΔTA−ΔTAO), β=f1 (α) and γ=f (α). Also, the target slip amounts of the adjoining operating ranges in the maps in FIG. 13A and FIG. 13B are derived by interpolation.

With the range-specific learning means implemented in the ECU 11 of the slip control device of the lock-up clutch in the fifth embodiment, if the target slip amount is updated, the target slip amount (F) of the operating range that was updated the last time is eliminated in the present updating with a standard value J. As a result, it is possible to decrease the influence of the updating process on other operating ranges for which the throttle aperture change rate differs.

For this reason, there is accurate and efficient updating and compensation of deviations in the target slip amount of the lock-up clutch slip control 8 accompanying changes over time of the automatic transmission 5, and it is moreover possible to improve fuel consumption without reducing drivability.

The updating amount in cases where the target slip amount of the operating range that was previously updated is eliminated from the present update can be 0 (zero), as was shown in the above-described embodiments, and also can be a value which is small compared to the other operating ranges in the present updating process. In other words, when implementing the invention, the throttle aperture change rate ΔTA changes according to the setting of the unit time. Thus the throttle aperture change rate ΔTA can be approximately zero and does not have to be exactly zero.

In the range-specific learning process in the above embodiments, when updating the target slip amount, all values were updated using addition. However, in implementing the invention it is not necessary to limit the updating process to addition. For example, any appropriate method such as multiplication can be used to update the target slip amount.

In the maps showing the target slip amounts (rpm) of the operating ranges in the above embodiments, the throttle aperture change rate ΔTA (%/sec) is set at, e.g., 0, 2, 5, 10 and 20. The turbine rotational speed NT (rpm) is set to, e.g., 800, 900, 1200 and 1600. However, in implementing the invention it is not necessary to limit operations to those values. Setting of values as well as setting of intervals and ranges can be appropriately changed based on experiments. The result should be improving fuel consumption without reducing drivability.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A lock-up clutch slip control device comprising:
   a fluid coupling having an input shaft and an output shaft connected via a fluid turbine, said input shaft being capable of receiving operative power from an engine;
   a lock-up clutch selectively directly connecting and disconnecting said input shaft and said output shaft together;

a slip control mechanism to control said lock-up clutch to selectively directly connect and disconnect said input and output shafts so that a difference in rotational speed of said input and output shafts is a target slip amount;

a change rate detector capable of detecting a throttle aperture change rate of a throttle valve of said engine;

slip amount computation means for selecting as said target slip amount a slip amount associated with operating range selected from a plurality of operating ranges responsive to said throttle aperture change rate and a rotational speed of said turbine; and range-specific learning means for, when said throttle aperture change rate is above a predetermined value, changing slip amounts of multiple operating ranges in said plurality of operating ranges based on said target slip amount of said associated operating range.

2. The lock-up clutch slip control device of claim 1, wherein said range-specific learning means is for changing slip amounts of operating ranges in said plurality of operating ranges exclusive of operating ranges corresponding to a condition where said throttle aperture change rate is substantially zero.

3. The lock-up clutch slip control device of claim 1, wherein said range-specific learning means is for changing by a uniform value slip amounts of operating ranges in said plurality of operating ranges exclusive of operating ranges corresponding to a condition where said throttle aperture change rate is substantially zero.

4. The lock-up clutch slip control device of claim 3, wherein said uniform value is selected based on a current throttle aperture change rate.

5. The lock-up clutch slip control device of claim 1, wherein:

said range-specific learning means is for changing slip amounts of operating ranges in said plurality of operating ranges exclusive of operating ranges corresponding to a condition where said throttle aperture change rate is substantially zero; and amounts of change of said slip amounts of operating ranges exclusive of ranges corresponding to a substantially zero throttle aperture change rate decreases in correspondence with a distance from a current operating range.

6. The lock-up clutch of claim 5, wherein amounts of change for operating ranges equidistant from said current operating range are equal.

7. The lock-up clutch of claim 6, wherein said amounts of change are selected according to a current throttle aperture change rate.

8. The lock-up clutch slip control device of claim 1, wherein:

said range-specific learning means is for changing slip amounts of operating ranges in said plurality of operating ranges exclusive of operating ranges corresponding to a condition where said throttle aperture change rate is substantially zero; and an amount of change of said slip amounts of operating ranges exclusive of ranges corresponding to a substantially zero throttle aperture change rate is selected based on a current throttle aperture change rate.

9. The lock-up clutch slip control device of claim 1, wherein:

said range-specific learning means is for changing only slip amounts of operating ranges in said plurality of operating ranges corresponding to a current throttle aperture change rate.

10. The lock-up clutch slip control device of claim 1, wherein said range-specific learning means is for changing slip amounts of operating ranges in said plurality of operating ranges exclusive of operating ranges updated during an immediately previous updating operation by said range-specific learning means.

11. A method of controlling a lock-up clutch in a transmission, said method comprising the steps of:

detecting a throttle aperture change rate of a throttle valve of an engine;

detecting a rotational speed of a turbine in said transmission;

selecting as a target slip amount a slip amount associated with an operating range selected from a plurality of operating ranges responsive to said throttle aperture change rate and said rotational speed of said turbine; and updating slip amounts of multiple operating ranges in said plurality of operating ranges based on said target slip amount when said throttle aperture change rate is above a predetermined value.

12. The method of claim 11, said updating step comprising a step of changing slip amounts of operating ranges in said plurality of operating ranges exclusive of operating ranges corresponding to a condition where said throttle aperture change rate is substantially zero.

13. The method of claim 11, said updating step comprising a step of changing by a uniform value slip amounts of operating ranges in said plurality of operating ranges exclusive of operating ranges corresponding to a condition where said throttle aperture change rate is substantially zero.

14. The lock-up clutch slip control device of claim 13, further comprising a step of selecting said uniform value based on a current throttle aperture change rate.

15. The lock-up clutch slip control device of claim 11, said updating step comprising a step of changing slip amounts of operating ranges in said plurality of operating ranges exclusive of operating ranges corresponding to a condition where said throttle aperture change rate is substantially zero, where amounts of change of said slip amounts of operating ranges exclusive of ranges corresponding to a substantially zero throttle aperture change rate decreases in correspondence with a distance from a current operating range.

16. The method of claim 15, wherein amounts of change for operating ranges equidistant from said current operating range are equal.

17. The method of claim 16, wherein said amounts of change are selected according to a current throttle aperture change rate.

18. The method of claim 11, said updating step comprising a step of changing slip amounts of operating ranges in said plurality of operating ranges exclusive of operating ranges corresponding to a condition where said throttle aperture change rate is substantially zero, where an amount of change of said slip amounts of operating ranges exclusive of ranges corresponding to a substantially zero throttle aperture change rate is selected based on a current throttle aperture change rate.

19. The method of claim 11, said updating step comprising a step of changing only slip amounts of operating ranges in said plurality of operating ranges corresponding to a current throttle aperture change rate.

20. The method of claim 11, said updating step comprising a step of changing slip amounts of operating ranges in said plurality of operating ranges exclusive of operating ranges updated during an immediately previous updating step.

* * * * *